United States Patent
Barsness et al.

(10) Patent No.: US 8,195,896 B2
(45) Date of Patent: Jun. 5, 2012

(54) RESOURCE SHARING TECHNIQUES IN A PARALLEL PROCESSING COMPUTING SYSTEM UTILIZING LOCKS BY REPLICATING OR SHADOWING EXECUTION CONTEXTS

(75) Inventors: Eric Lawrence Barsness, Pine Island, MN (US); David L. Darrington, Rochester, MN (US); Amanda Peters, Rochester, MN (US); John Matthew Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 404 days.

(21) Appl. No.: 12/136,166

(22) Filed: Jun. 10, 2008

(65) Prior Publication Data

US 2009/0307466 A1  Dec. 10, 2009

(51) Int. Cl.
  *G06F 13/00* (2006.01)
(52) U.S. Cl. ........................ 711/150; 718/102
(58) Field of Classification Search ......................... None
  See application file for complete search history.

(56) References Cited

U.S. PATENT DOCUMENTS

| | | | |
|---|---|---|---|
| 6,687,904 B1* | 2/2004 | Gomes et al. ................ | 718/102 |
| 6,810,474 B1* | 10/2004 | Miki ............................. | 712/216 |
| 7,594,234 B1* | 9/2009 | Dice ............................. | 718/108 |
| 2003/0005266 A1* | 1/2003 | Akkary et al. ................ | 712/220 |
| 2003/0018826 A1* | 1/2003 | Chaudhry et al. ............ | 709/310 |
| 2003/0079094 A1* | 4/2003 | Rajwar et al. ................ | 711/150 |
| 2003/0208673 A1* | 11/2003 | Chaudhry et al. ............ | 712/200 |
| 2004/0154011 A1* | 8/2004 | Wang et al. ................... | 717/158 |
| 2004/0162948 A1* | 8/2004 | Tremblay et al. ............ | 711/137 |
| 2005/0149697 A1* | 7/2005 | Enright et al. ................ | 712/214 |
| 2005/0177831 A1* | 8/2005 | Goodman et al. ............ | 718/100 |
| 2006/0004998 A1* | 1/2006 | Saha et al. .................... | 712/245 |
| 2006/0053351 A1* | 3/2006 | Anderson et al. ............ | 714/100 |
| 2007/0022422 A1* | 1/2007 | Tirumalai et al. ............ | 718/100 |
| 2007/0136289 A1* | 6/2007 | Adl-Tabatabai et al. ......... | 707/8 |
| 2007/0174555 A1* | 7/2007 | Burtscher et al. ............ | 711/137 |
| 2007/0204268 A1* | 8/2007 | Drepper ....................... | 718/102 |
| 2007/0255835 A1 | 11/2007 | Coppinger et al. | |

(Continued)

OTHER PUBLICATIONS

Martinez et al. (Speculative Locks for Concurrent Execution of Critical Sections in Shared-Memory Multiprocessors); Workshop on Memory Performance Issues, International Symposium on Computer Architecture, Jun. 2001, 8 pages.*

(Continued)

*Primary Examiner* — Keith Vicary
(74) *Attorney, Agent, or Firm* — Wood, Herron & Evans LLP

(57) ABSTRACT

A method, apparatus, and program product share a resource in a computing system that includes a plurality of computing cores. A request from a second execution context ("EC") to lock the resource currently locked by a first EC on a first core causes replication of the second EC as a third EC on a third core. The first and third ECs are executed substantially concurrently. When the first EC modifies the resource, the third EC is restarted after the resource has been modified. Alternately, a first EC is configured in a first core and shadowed as a second EC in a second core. In response to a blocked lock request, the first EC is halted and the second EC continues. After granting a lock, it is determined whether a conflict has occurred and the first and second EC are particularly synchronized to each other in response to that determination.

25 Claims, 5 Drawing Sheets

U.S. PATENT DOCUMENTS

2009/0125519 A1* 5/2009 Robison et al. ............. 707/8
2009/0320028 A1* 12/2009 Gellerich et al. ............. 718/102

OTHER PUBLICATIONS

Tanenbaum (Structured Computer Organization: Third Edition); Prentice-Hall, Inc; 1990; 5 pages.*

Rajwar et al. (Speculative Lock Elision: Enabling Highly Concurrent Multithreaded Execution), pp. 294-305, 34th Annual IEEE/ACM International Symposium on Microarchitecture (MICRO'01), 2001.*

Rajwar (Speculation-Based Techniques for Transactional Lock-Free Execution of Lock-Based Programs). PhD thesis, University of Wisconsin, Madison, WI, 2002, 224 total pages.*

Martinez et al. (Speculative Synchronization: Applying Thread-Level Speculation to Explicitly Parallel Applications); Proceedings of the 10th international conference on Architectural support for programming languages and operating systems; pp. 18-29; Year of Publication: 2002.*

* cited by examiner

RESOURCE SHARING TECHNIQUES IN A PARALLEL PROCESSING COMPUTING SYSTEM UTILIZING LOCKS BY REPLICATING OR SHADOWING EXECUTION CONTEXTS

FIELD OF THE INVENTION

The present invention relates to computing systems, and more particularly to sharing resources between execution contexts of a computing system of the type that includes a plurality of computing cores.

BACKGROUND OF THE INVENTION

Computing system technology has advanced at a remarkable pace recently, with each subsequent generation of computing system increasing in performance, functionality, and storage capacity, often at reduced cost. However, individual computing systems are still generally expensive and incapable of providing the raw computing power that is often required by modern requirements for computing power. One particular type of computing system architecture that generally fills this requirement is that of a parallel processing computing system. Each parallel processing computing system is often referred to as a "supercomputer."

Generally, a parallel processing computing system comprises a plurality of computing cores and is configured with a distributed application. Some parallel processing computing systems, which may also be referred to as massively parallel processing computing systems, may have hundreds or thousands of individual computing cores, and provide supercomputer class performance. Each computing core is typically of modest computing power and generally includes one or more processing units. Each computing core may be incorporated into a dedicated processing node, or each computing core may be a computing system. The distributed application provides work for each computing core and is operable to control the workload of the parallel processing computing system. Generally speaking, the distributed application provides the parallel processing computing system with a workload that can be divided into a plurality of tasks. Each computing node is typically configured to process one task. However, each task is typically further divided into one or more execution contexts, where each computing core of each computing node is typically configured to process one execution context and therefore process, or perform, a specific function. Thus, the parallel processing architecture enables the parallel processing computing system to receive a workload, then configure the computing cores to cooperatively perform one or more tasks and/or configure computing cores to process one execution contexts such that the workload supplied by the distributed application is processed.

Parallel processing computing systems have found application in numerous different computing scenarios, particularly those requiring high performance and fault tolerance. For instance, airlines rely on parallel processing to process customer information, forecast demand, and decide what fares to charge. The medical community uses parallel processing computing systems to analyze magnetic resonance images and to study models of bone implant systems. As such, parallel processing computing systems typically perform most efficiently on work that contains several computations that can be performed at once, as opposed to work that must be performed serially. The overall performance of the parallel processing computing system is increased because multiple computing cores can handle a larger number of tasks in parallel than could a single computing system. Other advantages of some parallel processing systems include their scalable nature, their modular nature, and their improved level of redundancy.

When sharing resources among the computing cores, and particularly the execution contexts of computing cores, parallel processing computing systems of the prior art are typically limited by the Critical Section Problem. Generally speaking, the Critical Section Problem arises when multiple entities are competing for the same resource. When shared resources are manipulated, the entity manipulating the resource is within a "Critical Section" during which that time the entity, and only that entity, must be able to manipulate the data without interference. Interference from other entities would introduce inconsistency to, or otherwise corrupt, the resource. To provide consistency within a resource of a parallel processing computing system, the Critical Section Problem requires that only one execution context be provided access to the resource at any given time. In conventional parallel processing computing systems, the Critical Section is not merely "manipulation" of the resource, but rather "access" of the resource by an execution context, as the execution contexts often need to manipulate the resource just to access the resource.

For example, and in one general embodiment, the resource may be a block of data, and the conventional approach to the Critical Section Problem is to allow only one execution context to access or manipulate that block of data. As such, conventional parallel processing computing systems provide a "lock" on the resource to the first execution context that attempts to access the resource. Other execution contexts are prevented from even accessing the resource, although they may be granted a lock on a first-come-first-served basis.

However, by locking a resource, conventional parallel processing computing systems often break concurrency, and force execution contexts and computing cores to wait in line in a serial manner for access to the resource. As such, computing cores typically stall as they wait to lock the resource, defeating the advantages, and purpose, of implementing a parallel processing computing system entirely.

Consequently, there is a continuing need to access a resource in such a manner that execution contexts denied locks on the resource may continue processing in parallel and without breaking consistent access to the resource.

SUMMARY OF THE INVENTION

Embodiments of the invention provide for a method, apparatus, and program product to address the Critical Section Problem, or, more generally, contention issues, that arise when multiple execution contexts (i.e., tasks, instances of work, split workloads, etc) in a parallel processing computing system attempt to access the same shared resource. As such, embodiments of the invention provide execution contexts that have been denied, or blocked, locks on the resource with consistent access to the resource.

In one embodiment consistent with aspects of the invention, the Critical Section Problem is addressed by replicating execution contexts denied locks on the resource and providing those replicated execution contexts with access to the resource such that more than one execution context and/or computing core is provided consistent access to the resource. In particular, in that embodiment, the first execution context that attempts to lock a resource is granted a lock, while the second execution context (and indeed, all other execution contexts) that attempts to lock the resource subsequent to the first execution context, and during the time when the first execution context holds the lock, is denied. The second execution context is replicated as a third execution context, and that third execution context is allowed to proceed substantially in parallel with the first execution context. However, when it is determined that the first execution context modifies the resource, or somehow causes a conflict between the resource and the third execution context, the third execution context is restarted after the modification of the resource is complete.

In an alternate embodiment consistent with aspects of the invention, the Critical Section Problem is addressed by shadowing execution contexts. In particular, in that embodiment, a first execution context on a first computing core is shadowed as a second execution context on a second computing core. In response to a request to lock the resource from the first or second execution context being denied, the first execution context is halted and the second execution context continues. Thus, although the lock request is denied, the processing on the second execution context may continue. After the lock request is granted, it is determined whether the resource was modified while the initial lock request was blocked. The first execution context is synchronized to the second execution context in response to determining that the resource was not modified while the request was blocked. As such, an execution context, which may have been split into the first and second execution contexts, has been operating in parallel while a lock request was blocked. However, the second execution context is synchronized to the first execution context in response to determining that the resource was modified while the request was blocked. As such, an execution context that experiences a conflict is restarted or reversed, while if no conflict occurs, the execution context has been allowed to proceed as if the execution context had been granted the lock in the first place, and thus with little adverse impact on performance. Thus, by shadowing an execution context, more than one computing core is provided consistent access to the resource.

These and other advantages will be apparent in light of the following figures and detailed description.

BRIEF DESCRIPTION OF THE DRAWINGS

The accompanying drawings, which are incorporated in and constitute a part of this specification, illustrate embodiments of the invention and, together with a general description of the invention given above and the detailed description of the embodiments given below, serve to explain the principles of the invention.

DETAILED DESCRIPTION

Figure 1:
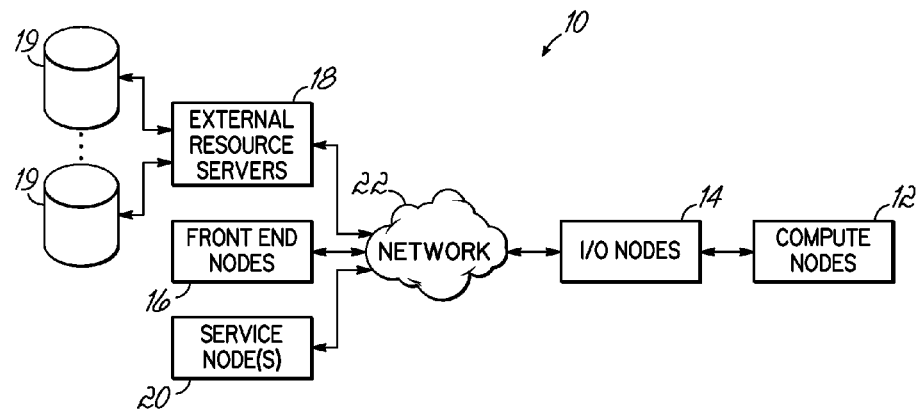
FIG. 1 is a diagrammatic illustration of parallel processing computing system consistent with embodiments of the invention.

Embodiments of the present invention include a method, apparatus, and program product to avoid the Critical Section Problem that arises when multiple execution contexts attempt to lock a resource.

Parallel processing computing systems, such as the BlueGene/L system created by International Business Machines, often include a cellular node architecture. As discussed below in detail, the BlueGene/L system is built from blocks of node midplanes that may be connected through several inter- and intra-midplane networks. The system may be constructed incrementally, with midplane cells being added to build the larger, final system. As each midplane is added to the system, the hardware and system software must be tested for faulty configurations, including interconnect, processing, memory and software control.

The primary point to point message passing network for BlueGene/L is a three dimensional torus network, where every node is connected to six other nodes in a mesh, forming a cube of (x,y,z) nodes. For example, a 512 node midplane torus consists of an 8×8×8 node arrangement. "Torus" implies that the nodes on the face of the cube wrap around to connect to nodes on the opposite face. This torus network can be extended in all three directions by connecting the faces of these logical cubes via link chips, which are essentially switches between midplanes. The link chips are connected via cables, while the internal torus is connected via circuitry within the midplane. Each node is configured with one or more computing cores.

When an execution context configured on a computing core attempts to access or modify a resource, it requests a lock on the resource. When the lock is denied, the prior art indicates that execution context must wait for the lock to be granted. In effect, the execution contexts denied locks on the same resource form a line and are serialized in their access to the resource, thus reducing the effectiveness of the parallel processing computing system of the prior art. In one embodiment consistent with the present invention to avoid the Critical Section Problem, there is provided a method that replicates execution contexts that attempt to lock the resource but are denied. In an embodiment of the present invention, a first execution context locks a resource. A second execution context attempts to lock the resource but is blocked. This second execution context is replicated as a third execution context, and the third execution context is executed with the first execution context substantially in parallel. To this end, the second execution context may be halted, and the third execution context may be granted a speculative lock. In response to determining that the first execution context modifies the resource, the third execution context is restarted after the resource has been modified.

In an alternate embodiment consistent with the present invention, there is provided a method to configure an execution context on an optimistic core and shadow that execution context on a pessimistic core. When a lock request from either of the execution contexts on the optimistic or pessimistic cores is denied, the pessimistic core may be halted while the optimistic core continues. The execution context on the optimistic core may be configured with a speculative lock on the resource such that, while the optimistic core is waiting for the lock, it may continue processing the execution context. After the lock request is granted to either of the execution contexts on the optimistic or pessimistic cores, it is determined whether the resource was modified while the request was blocked. The optimistic core is synchronized with the pessimistic core if the resource was modified, while the pessimistic core is synchronized with the optimistic core if the resource was not modified. The optimistic and pessimistic cores may process the execution context and shadowed execution context substantially in parallel, or the pessimistic core may be treated as a "holding" core for the shadowed execution context while the optimistic core processes the execution context.

Hardware and Software Environment

Turning to the drawings, wherein like numbers may denote like parts throughout several views, FIG. 1 is a diagrammatic illustration showing a parallel processing computing system ("system") 10 consistent with embodiments of the invention. In particular, the system 10 may have an architecture consistent with a BlueGene® computer architecture, as developed by International Business Machines, Inc. ("IBM") of Armonk, N.Y. For example, and in other specific embodiments, the architecture of the system 10 may be consistent with a BlueGene/L architecture, a BlueGene/C architecture, a BlueGene/P architecture, a BlueGene/Q architecture, another parallel processing system architecture, or combinations thereof. Therefore, it will be appreciated by one having ordinary skill in the art that the system 10 is representative of other parallel processing systems, whether or not specifically mentioned herein.

The system 10 may include a plurality of processing nodes (hereinafter, "nodes"). The nodes may include a plurality of computing nodes ("compute nodes") 12 and a plurality of input/output nodes ("I/O nodes") 14. The compute nodes 12 are arranged in a regular array or matrix and collectively perform the bulk of the work performed by the system 10. Each compute node 12 includes one or more computing cores and a memory resource from which to store and execute tasks. The compute nodes 12 communicate with each other through a torus network or a tree network, as described more fully herein. A fully configured BlueGene/L system, in one specific embodiment, includes 65,536 compute nodes 12 operable to run user applications and 1,024 I/O nodes 14 operable to maintain an interface between the compute nodes 12 and other system components.

The I/O nodes 14 maintain an interface between the compute nodes 12 and front end nodes 16, external resource servers 18, service nodes 20, and network 22. The I/O nodes 14 may interface with the front end nodes 16, external resource servers 18, and service nodes 20 by way of the network 22, which in a specific embodiment may be a gigabit Ethernet network. The I/O nodes 14 are operable to maintain communication for a group of compute nodes 12 from among the plurality of compute nodes 12. In a specific embodiment, each I/O node 14 maintains communications for sixty-four compute nodes 12. In this manner, each I/O node 14 provides access to resources of the system 10 and processes, programs, tasks, or data in other systems for a specific number of compute nodes 12. The I/O nodes 14 may also be operable to perform process authentication and authorization, job accounting, debugging, troubleshooting, booting, and configurations. Thus, tasks for the compute nodes 12 are simplified and additional burdens on each compute node 12 that would present themselves by interfacing with vast numbers of I/O nodes 14 and other system components are avoided.

The front end nodes 16 may store compilers, linkers, loaders, and other programs to interact with the system 10. The front end nodes 16 may be accessed by a user, who may submit one or more programs for compiling, tasks for execution, execution contexts, workloads, or jobs to the service nodes 20. As such, the front end nodes 16 may be configured with user interfaces, such as user input devices and a display (neither shown). In alternate embodiments, the front end nodes 16 may interface with one or more workstations or other computing systems (not shown). The front end nodes 16 may each include a collection of processor and memory resource that performs certain auxiliary functions which, for reasons of efficiency or otherwise, are best performed outside compute nodes 12, I/O nodes 14, or service nodes 20. For example, interactive data input, software code editing, software code compiling, and/or other user interface functions are generally handled by front end nodes 16.

The service nodes 20 may include databases and administrative tools for the system 10. The databases may maintain state information for the computing nodes 12, while the administrative tools may control the scheduling and loading of programs, tasks, data, and jobs onto the compute nodes 12, and in particular each computing core. As such, the service nodes 20 may, in some embodiments, assemble a subset of compute nodes 12 from the plurality of compute nodes 12 (i.e., a "block" of two or more compute nodes 12) and dispatch at least one task, job, application, execution context, or program to the block for execution. Hereinafter, the at least one task, job, application, execution context, or program will be referred to as a "execution context" for the sake of brevity. An execution context may be communicated across the network 22 and through the I/O nodes 14 to the compute nodes 12 to be processed in a computing core. It will be appreciated by one having ordinary skill in the art that the functionality of the front end nodes 16 and service nodes 20 may be combined to form a control subsystem operable to manage, control, and schedule tasks for the compute nodes 12.

Front end nodes 16 and service nodes 20 may each include of a block of compute nodes 12 and at least one I/O node 14 of the system 10. In this way, front end nodes 16 and service nodes 20 may be internally connected to the compute nodes 12 and I/O nodes 16 through one or more of the plurality of networks described hereinafter. Alternately, front end nodes 16 and service nodes 20 may each include of a block of compute nodes 12 and at least one I/O node 14 separate from the system 10 (i.e., "stand-alone" nodes). The external resource servers 18 may be servers that provide interfaces to various data storage devices, such as, for example, disk drives 19, or other I/O devices, resources, or components that may be accessed to complete a task.

Figure 2:
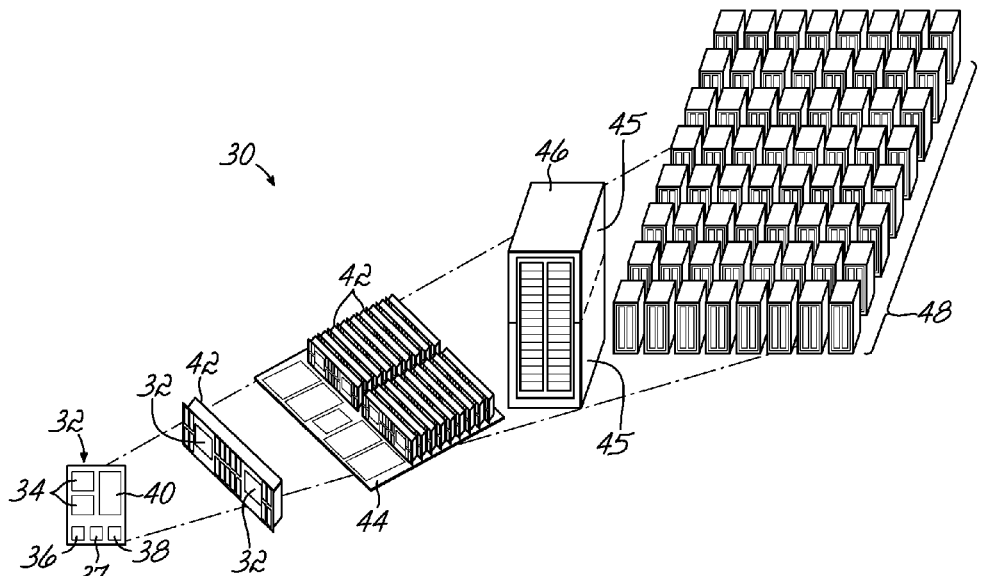
FIG. 2 is a diagrammatic illustration of an architecture of the parallel processing computing system of FIG. 1 showing the element progression from a computing core to a card, a node board, a cell, a cabinet, and finally to the parallel processing computing system consistent with embodiments of the invention.

FIG. 2 is a diagrammatic illustration 30 showing components 32, 42, 44, and 46 of the system 10 consistent with embodiments of the invention. The system 10 comprises a highly scalable, cell-like architecture that can be replicated in a regular pattern, with no introduction of bottlenecks as the system is scaled up.

The system 10 fundamentally includes the plurality of nodes, a node being shown generally at 32 (i.e., node 32 may be a compute node 12, an I/O node 14, a front end node 16, or a service node 20). Each node 32 typically comprises one or more computing cores 34, an Ethernet adapter 36, a torus network adapter 37, a collective network adapter 38, and a memory resource ("memory") 40, which may be a local and/or or remote cache memory. Additionally, or alternatively, memory 40 includes any other type of memory resource, such as random access memory ("RAM"), synchronous dynamic RAM ("SDRAM"), an array of memristors, or another memory resource as is known in the art. Two nodes 32 may be mounted onto a card 42. Seventeen cards 42 (i.e., sixteen compute node 12 cards and one I/O node 14 card) are typically placed on a node board 44. Sixteen node boards 44 comprise a midplane, or cell 45, two of which may be positioned inside a cabinet 46 for a total of one-thousand and twenty-four compute nodes 12 and sixty-four I/O nodes 14 per cabinet 46, or five-hundred and twelve compute nodes 12 and thirty-two I/O nodes 14 per cell 45. The system 10 may include sixty-four cabinets 46 as shown at 48, and, thus, over sixty-nine thousand nodes. In alternate implementations of the system 10 consistent with embodiments of the invention, the system 10 may include more or fewer cabinets 46, cells 45, boards 44, cards 42, and/or nodes 34.

Figure 3:
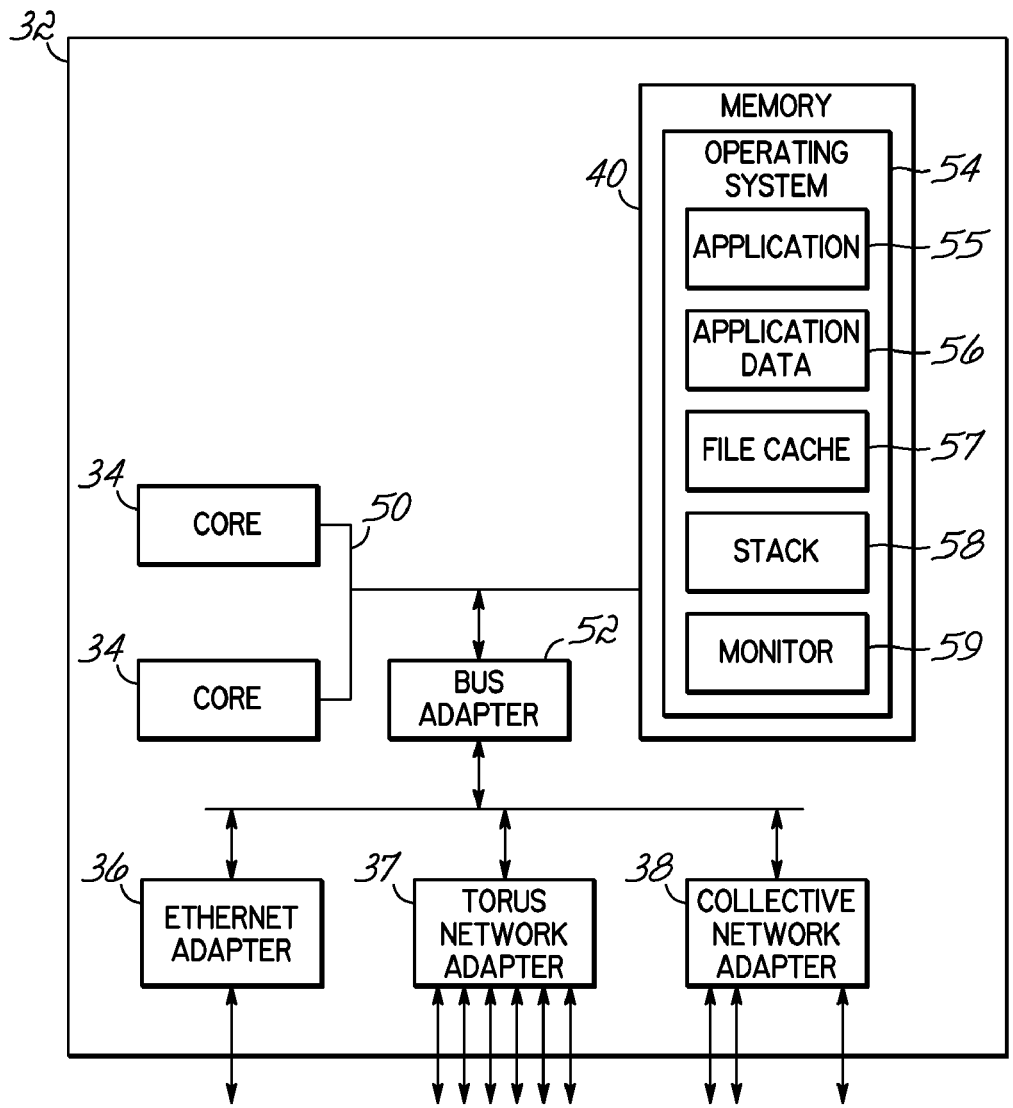
FIG. 3 is a block diagram showing the hardware and software components of one embodiment of the computing core of FIG. 2.

FIG. 3 is a block diagram showing the hardware and software components of one embodiment of a node 32 of the system 10 of FIG. 1 and FIG. 2. Each node 32 includes one or more computing cores 34 that communicate with a memory 40 by way of a bus as at 50 managed by a bus adapter 52. Each computing core 34 may include one or more processors, controllers, field programmable gate arrays, or application specific integrated circuit circuits, while memory 40 may include random access memory devices (including synchronous dynamic random access memory), cache memories, non-volatile memories, and read-only memories. For example, and in one specific embodiment, each computing core 34 may be a microprocessor, such as a PowerPC microprocessor as produced by IBM. For example, and in another specific embodiment, each computing core 34 may be a multi-element architecture microprocessor that includes one general purpose processing element and a plurality of synergistic processing elements, such as a Cell Broadband Engine Architecture microprocessor as jointly developed by IBM, Sony Computer Entertainment of Tokyo, Japan, and Toshiba of Tokyo, Japan. As shown in FIG. 3, each node 32 includes two computing cores 34. One having ordinary skill in the art will appreciate that each node 32 may include more or fewer computing cores 34 than those illustrated, and in one specific embodiment each node 32 includes four computing cores 34.

Each node 32 is configured with an operating system 54 operable to execute an application 55. The operating system 54 may be a simplified-function operating system that includes state data for maintaining the processing state(s) of the node 32. In one specific embodiment, operating system 54 is operable to only support only one, or a few, tasks at a given time, as opposed to a multi-tasking operating system configured on a typical personal computing system. As such, operating system 54 may not, and advantageously does not, include certain functions normally associated with a multi-tasking operating system, including software, routines, components, or program code to support multi-tasking, different I/O devices, error diagnostics and recovery, etc. As such, and in one specific embodiment, the operating system 54 may include a simplified version of the Linux operating system. It will be appreciated by one having ordinary skill in the art that other operating systems may be used, and that it is not necessary that all nodes 32 employ the same operating system (i.e., the application 55 may be an application operable to be installed across multiple and different operating systems, or "multi-platform" application).

Application 55 is a copy of program code being executed by the node 32, and may include a complete copy of program code being executed by the system 10. Alternately, application 55 may be a subdivided portion of the program code being executed by the system 10 as a whole. As such, the application 55 may be a distributed application of the type that is operable to be spread across a plurality of nodes 32 (i.e., more than one node 32). Application 55, in one embodiment, is operable to configure one or more execution contexts for each computing core 34 on the node 32 upon which it is configured.

Local copies of data for the application 55, or data from the application 55, may be reserved in some portion of the memory 40 for that application data 56. Similarly, some portion of the memory 40 may be reserved in a file cache 57 to store data read from, or to be written to. Memory 40 may further include a stack 58 to store states of tasks that may be returned to. In this way, the task may be reversed, and the data used by the task returned to its state before the task was executed. Similarly, the task may be backed up to a particular point of execution (i.e., a point after the task began but before it finished or was interrupted).

A monitor module ("monitor") 59 may be configured on nodes 32 when they attempt to lock resources but are blocked. The monitor 59 may be used to assist in monitoring a resource to determine when that resource is no longer locked. In one embodiment consistent with the invention, the monitor 59 may be configured on nodes 32 that are granted a speculative lock on that resource (i.e., the node 32 is operable to process data from the resource, but not change the data on the resource) and determine if a conflict develops between the resource and the copied resource data on the node 32 (i.e., a separate node 32 that has locked the resource and changes the resource such that the data on the node 32 is no longer consistent with the resource, or the node 32 attempts to change the resource such that the data on the separate node 32 that has locked the resource is no longer consistent with the resource). In an alternate embodiment, the monitor 59 may be configured on nodes 32 that are granted a speculative lock on that resource and include a list indicating an order for those nodes 32 waiting to lock the resource.

The computing cores 34 may communicate through the bus 50 to a bus adapter 52. The bus adapter 52 maintains the integrity of data flow in the node 32 and allows the computing cores 34 to transmit data to one or more network adapters. Similarly, the bus adapter 52 is configured to transmit data to the computing cores 34 or memory 40 from the one or more network adapters. The network adapters may include an Ethernet adapter 36, a torus network adapter 37, and a collective network adapter 38. The Ethernet adapter 36, torus network adapter 37, and collective network adapter 38 interconnect each node 32 to provide multiple complementary, high speed and low latency networks. These networks may include a private Ethernet network that provides access to any node 32 for configuration, booting, and/or diagnostics (i.e., through the Ethernet adapter 36), as well as a three-dimensional torus network operable to provide peer-to-peer communication between the nodes 32 (i.e., through the torus network adapter 37) and a collective network for collective messaging communication (i.e., through the collective network adapter 38). Each node 32 may use part of one computing core 34, or one or more computing cores 34 in their entirety, to manage the network connections and the network adapters 36, 37, and 38 of that node 32.

One having ordinary skill in the art will appreciate that additional components, memory, communications adapters, network adapters, or interfaces may be provided for each node 32 without departing from the scope of the present invention. For example, and in a specific embodiment, each I/O node 14 may be further configured with additional adapters, such as another Ethernet adapter or other I/O hardware to communicate with the front end nodes 16, external resource servers 18, service nodes 20, and/or network 22. Additionally, in another specific embodiment, each I/O node 14 may be configured with an operating system 54 that includes additional I/O interface software or software that adds additional functionality, such as software that dedicates one or more computing cores 34 to I/O operations only. Furthermore, each I/O node 14 may be configured with additional components, such as a computing core 34 dedicated only to I/O operations and an additional external memory that provides the I/O node 14 additional resources to perform I/O tasks. In another specific embodiment, each node 32 may be further configured with an adapter to communicate to a JTAG master circuit, providing back-door access into the node 32 for testing and troubleshooting in a manner well known in the art.

Figure 4:
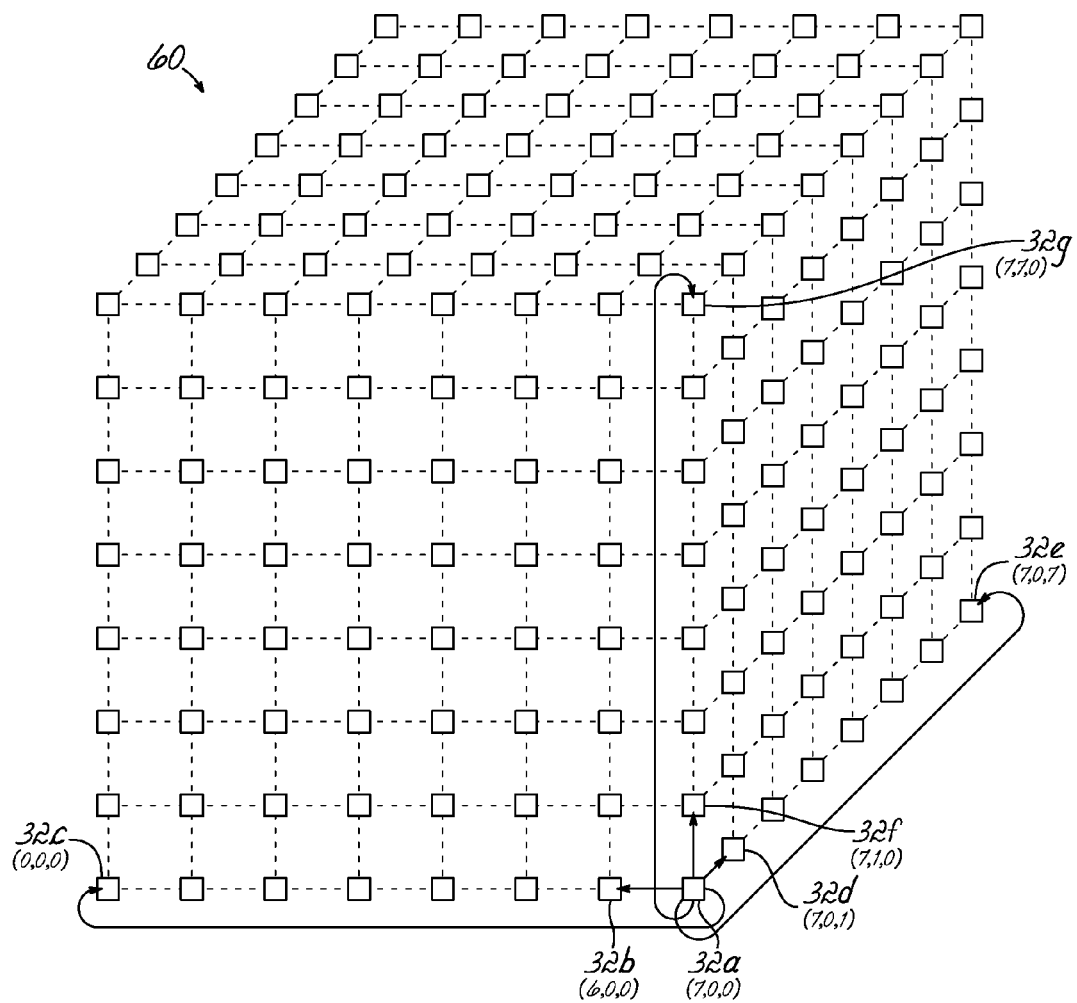
FIG. 4 is a simplified block diagram illustrating a three-dimensional torus network through which the computing cores of the parallel processing computing system of FIG. 1 and FIG. 2 may communicate.

The torus network adapter 37 provides each node 32 access to a point-to-point network configured as a three-dimensional torus where every node is connected to six other nodes in a mesh, forming a "cube" of (x,y,z) nodes. As such, each node 32 may communicate in one of six directions through the six bidirectional links shown coming from the torus network adapter 37 in FIG. 3. FIG. 4 is a simplified block diagram showing the three-dimensional torus network 60 of a cell 45 of the system 10 of FIG. 1 and FIG. 2. As illustrated in FIG. 4 and previously disclosed, each cell 45 may include an eight-by-eight matrix of five-hundred and twelve interconnected nodes 32. Advantageously, each node 32 may be equally distant to its six neighbors, except for those on the "edges" or "faces" of the torus network 60 (i.e., the edges or faces of the three-dimensional matrix torus network 60). Those nodes 32 on the edges or faces of the torus network 60 may communicate through communications links (i.e., wires, leads, network connections) that are "wrapped" around the network 60.

Each node 32 includes a set of six node-to-node communications links. In the context of the present invention, and to illustrate communications in the torus network 60, the cell 45 includes a node 32a with the coordinates (7,0,0). This node 32a may be a particular type of node 32, such as a master compute node operable to control a subset of the compute nodes in the cell 45. As illustrated, the node 32a may communicate with any other node 32 in the torus network 60 by initially communicating to one of six "neighbor" nodes 32b-g linked to the node 32a through direct inter-nodal communications paths (i.e., paths which do not have to traverse another compute node 12). The coordinates of these neighbor nodes are (6,0,0) for node 32b, (0,0,0) for node 32c, (7,0,1) for node 32d, (7,0,7) for compute node 32e, (7,1,0) for compute node 32f, and (7,7,0) for compute node 32g. As shown in FIG. 4, the torus network 60 is "wrapped" at the edges. As such, for any given node 32, it is possible to algorithmically determine the set of neighbors of that node 32 from the matrix structure and location of that node 32 in the torus network 60.

One skilled in the art will appreciate that any number of alternate architectures may be used in the alternative for the system 10. While FIG. 1 illustrates separate resource servers 18 and service nodes 20, one having ordinary skill in the art will appreciate that the resource servers 18 may be service nodes 20 configured to maintain the resources of the system 10. Additionally, while the node 32 of FIG. 3 comprises a specific hardware implementation having particular application within the context of an embodiment consistent with the invention, it is not intended to limit the scope of the invention. It should consequently be appreciated that the invention may be implemented in other computers and data processing systems, e.g., in single or multi-user computers such as workstations, desktop computers, portable computers, server computers and the like, or in other programmable electronic devices (e.g., incorporating embedded controllers and the like) operating as, or within, a parallel processing computing system. That is, the number of card, processors, slots, etc., and network configurations may change according to implementation or application specifications.

Additionally, it will be appreciated by one having skill in the art that the representative torus network 60 of FIG. 4 is merely illustrative, and that actual physical considerations may prevent the physical structure of the torus network 60 shown in FIG. 4. Moreover, a wide variety of interconnection types, network types, member types, etc., may be permitted to coexist with one another in an efficient and reliable manner in parallel computing system. As such, nodes 32 in a cell 45 may be arranged in a tree network, bus network, linear network, mesh network, style-7 network, or another suitable network as is well known in the art without departing from the scope of the invention. Individual nodes may thus not be physically located in close proximity with other nodes as is well known in the art (i.e., the individual nodes may be geographically separated from other nodes).

Furthermore, those skilled in the art will recognize that the exemplary environments illustrated in FIGS. 1-4 are not intended to limit the present invention. While the nodes of FIGS. 1-4 are shown connected in a modular fashion, any combination of local area networks (LAN's), wide area networks (WAN's) and/or other networking topologies known in the art may alternatively be used to network computing processors comprising nodes. Indeed, those skilled in the art will recognize that other alternative hardware and/or software environments may be used without departing from the scope of the invention The discussion hereinafter will focus on the specific routines utilized in the above-described system 10 to address lock contention issues in a manner consistent with the invention. The routines executed to implement the embodiments of the invention, whether implemented as part of an operating system or a specific application, component, program, object, module or sequence of instructions executed by one or more nodes 32, computing cores 34, or other processors, will be referred to herein as "computer program code," or simply "program code." However, the routines executed by the nodes 32 or computing cores 34 consistent with processing a execution context (i.e., normal processing of an execution context, task, application 55, program, routine, process, object, etc), whether implemented as part of the operating system 54, application 55, component, program, object, module, or sequence of instructions executed by the node 32 will be referred to herein as an "execution context." The computer program code typically comprises one or more instructions that are resident at various times in various memory and storage devices in the system 10, and that, when read and executed by one or more nodal or other processors of the system 10, cause that system to perform the steps necessary to execute steps, elements, and/or blocks embodying the various aspects of the invention.

Moreover, while the invention has and hereinafter will be described in the context of fully functioning computers and computer systems, those skilled in the art will appreciate that the various embodiments of the invention are capable of being distributed as a program product in a variety of forms, and that the invention applies equally regardless of the particular type of computer readable signal bearing media used to actually carry out the distribution. Examples of computer readable signal bearing media include but are not limited to recordable type media such as volatile and nonvolatile memory devices, floppy and other removable disks, hard disk drives, optical disks (e.g., CD-ROM's, DVD's, etc.), among others, and transmission type media such as digital and analog communication links.

In addition, various program code described hereinafter may be identified based upon the application or software component within which it is implemented in a specific embodiment of the invention. However, it should be appreciated that any particular program nomenclature that follows is used merely for convenience, and thus the invention should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, APIs, applications, applets, etc.), it should be appreciated that the invention is not limited to the specific organization and allocation of program functionality described herein.

Resource Sharing Via Execution Context Replication

In one embodiment consistent with aspects of the invention, resource contention issues that arise when multiple execution contexts attempt to lock a resource are addressed by replicating execution contexts that are denied locks on the resource. These replicated execution context may be provided with access to the resource such that more than one execution contexts and/or computing cores may perform work while having access to the resource. The access for the replicated execution contexts may be provided by issuing speculative locks to the replicated execution contexts. Thus, replicated execution contexts that depend upon the same resource may be processed in parallel while the resource is locked, avoiding serialization while the resource is locked.

In particular, in this embodiment, the first execution context that attempts to lock a resource may be granted a lock. A second execution context (and indeed, all subsequent execution contexts) that attempts to lock the resource during the time when the first execution context holds the lock may be denied. The second execution context may be replicated as a third execution context, and that third execution context may be processed substantially in parallel with the first execution context. The third execution context may be on the same computing core, or a different computing core, than the second execution context. However, when the first execution context modifies the resource such that it affects the processing of the third execution context, the third execution context is reversed after the modification of the resource is complete. Similarly, when a conflict between the resource and the third execution context arises, the third execution context is reversed after the modification of the resource is complete. Reversing the third execution context may include restarting the third execution context after the modification of the resource is complete.

Figure 5:
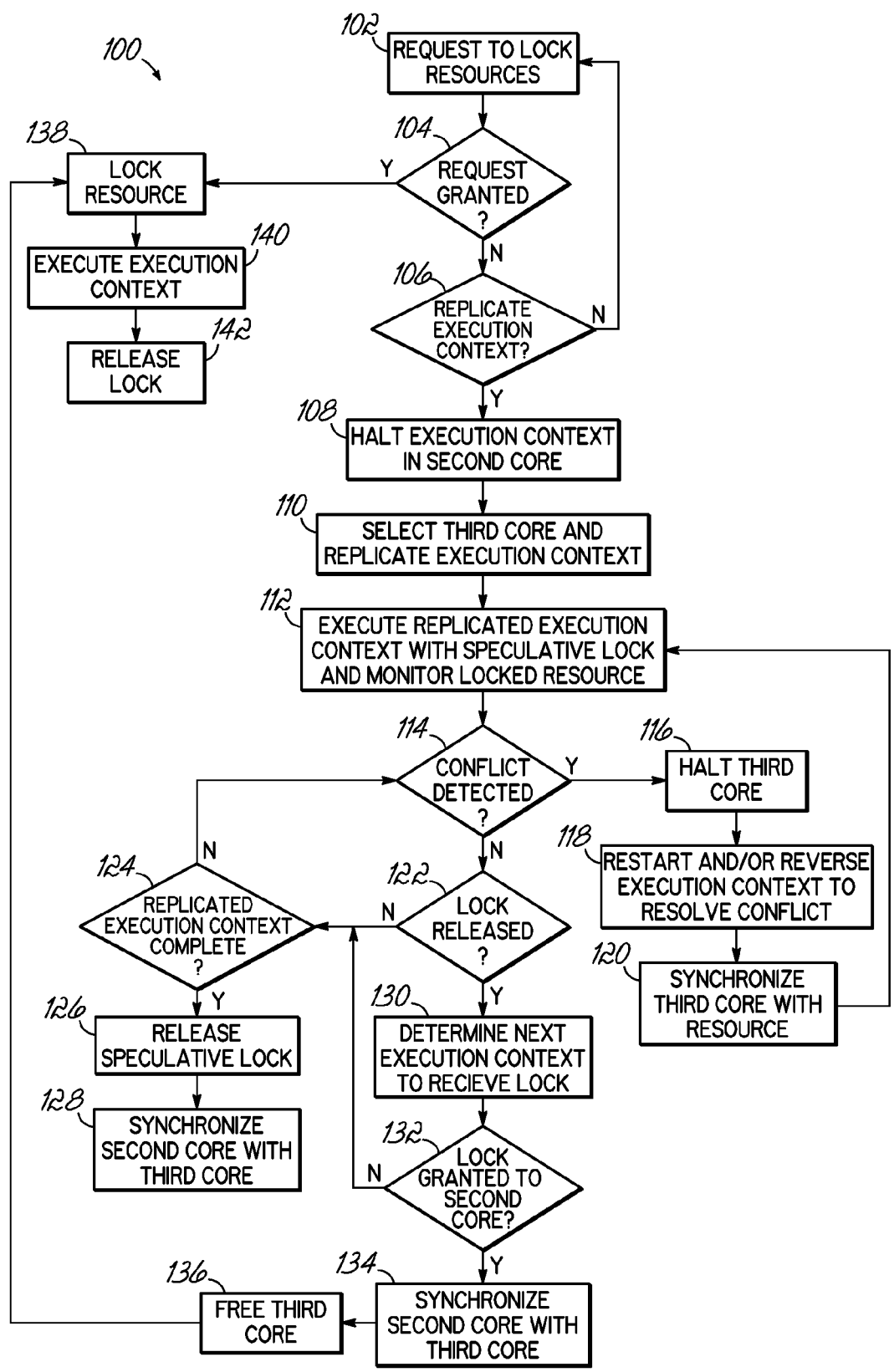
FIG. 5 is a flowchart illustrating blocks of a program code executable by the parallel processing computing system of FIG. 1 and FIG. 2 to address issues that arise when multiple execution contexts attempt to access a resource by replicating execution contexts when a lock for a resource is requested but cannot be granted.

FIG. 5 is a flowchart 100 illustrating blocks of a program code executable by the system 10 of FIG. 1 and FIG. 2 to address resource contention issues by replicating execution contexts when a lock for a resource is requested but cannot be granted. The flowchart 100 illustrates a way to maintain concurrency in multiple execution contexts, nodes 32, and/or computing cores 34 without serializing, stalling, or waiting for resource access in the event of lock request denial. In block 102, the program code monitors a lock request from an execution context processing on a computing core 34. The lock request may be directed to one or more resources of the system 10, including one or more resources managed by the resource servers 18, one or more resources internal to the nodes 32 (i.e., compute nodes 12, I/O nodes 14, front end nodes 16, service nodes 20, etc.), other resources of the system 10, and/or one or more other resources across the network 22, such as one or more resources on another computer (not shown), multi-node system (not shown), or resource. For example, the lock request may be for a particular piece of data or access to a component, such as a network adapter or a section of physical memory of a computer or node 32. Furthermore, one having ordinary skill in the art will appreciate that the lock request may come from any of the computing cores 34 of any of the nodes 32 (i.e., from one or more compute nodes 12, I/O nodes 14, front end nodes 16, and/or service nodes 20) and thus the description that the lock request originates from a particular execution context, computing core, or node, is not intended to, and should not, limit the scope of the present invention.

In one embodiment, a compute node 12 associated with the computing core 34 that initiates the lock request communicates the lock request to its associated I/O node 14, which in turn may communicate the lock request to the resource server 18. The resource server 18 may lock the resource on behalf of the compute node 12 and send a copy of the locked resource data to the compute node 12. Alternatively, the resource server 18 may indicate that the lock request has been blocked.

In alternate embodiments, a compute node 12 associated with the computing core 34 that initiates the lock request communicates the lock request for a database object, database memory, or database data to a database manager. In one of these embodiments where the database is an external database, the compute node 12 communicates the lock request to its associated I/O node 14, which in turn communicates the lock request to the database manager of the external database, such as that managed by a resource server 18, a database on the service nodes 20 or a database across the network. In this embodiment, the database manager may lock the resource and send a copy of the locked resource data to the compute node 12, or indicate that the lock request has been blocked. In another one of these embodiments where the database is configured across another node 32, the compute node 12 communicates the lock request to the database manager configured on that other node 32. In these alternate embodiments, the database manager may lock the resource and send a copy of the locked resource data to the compute node 12, or indicate that the lock request has been blocked.

In another alternate embodiment, a compute node 12 associated with the computing core 34 that initiates the lock request communicates the lock request for a shared memory area to another node 32 configured with the shared memory area. That other node 32 may lock the resource and send a copy of the locked resource data to the compute node 12, or indicate that the lock request has been blocked.

It will be appreciated by one having ordinary skill in the art that the embodiments disclosed above are merely exemplary and not intended to limit the scope of the present invention. As such, the embodiments disclosed above generally illustrate various ways a lock request is sent through the system 10. Therefore, it will be apparent that the node 32 that generates the lock request may issue the lock request to any node (i.e., compute nodes 12, I/O nodes 14, front end nodes 16, service nodes 20, and itself) that has a resource (i.e., memory, shared memory, files, objects, database components, physical component etc.), any resource server 18 that maintains a resource, and any other device that may be connected across the network 22 that has a resource. Additionally, one having ordinary skill in the art will appreciate that when a lock request is denied the service nodes 20 and the node 32 that generated the lock request may be notified that the lock was blocked.

In block 104, the program code determines whether the lock request has been granted. The lock request may be blocked when there is already a lock on the resource by another execution context on a first computing core 34, or when there is already a lock request pending for the resource by another execution context on the first computing core 34 (hereinafter, the "first core"). If so blocked, block 104 passes control to block 106, where the program code determines whether the execution context that was blocked from the lock should be replicated. As such, the program code may determine whether to replicate the execution context based on historical information and/or system configuration information in block 106. The historical information used to determine whether to replicate a execution context may include at least one of the following: an identification ("ID") of the execution context that issued the lock request, an ID of the execution context that locked the resource, an ID of the lock itself (i.e., a lock number indicating the type of lock), an ID of the resource, a name of the resource, the historical lock time of locks on a particular resource, the historical lock time of the execution context that locked the resource, the historical number of conflicts that occur with the execution context that locked the resource, the historical number of conflicts that occur with the execution context that requested the lock, the historical number of conflicts that occur with that resource, and/or the amount of time it takes to replicate the execution context denied the lock to a separate node. The system configuration information used to determine whether to replicate an execution context may include information about free computing cores 34 (i.e., cores that are not currently configured with tasks), free nodes 32, or processing capabilities of the system 10. For example, and in one specific embodiment, the program code may determine in block 106 that an execution context should not be replicated when the mean lock for a resource is short and/or the amount of time to replicate the execution context is significant. Similarly, the program code may determine in block 106 that an execution context should not be replicated when there are no free nodes 32 or computing cores 34 (i.e., each node 32 or computing core 34 is configured and/or busy). When the program code determines that the execution context should not be replicated, the program may continue back to block 102.

When the lock request is blocked and the program code determines that the execution context should be replicated, the program code halts the execution context in the computing core 34 that initiated the lock request (which may be a second computing core 34, or "second core") in block 108. In block 110, the program code reads the system configuration information to determine whether there is a free computing core 34 (i.e., a computing core 34 that is not busy), then replicates the execution context and data from the second core to the free computing core 34 (hereinafter, the "third core"). One having ordinary skill in the art will appreciate that if there is no free computing core 34 (i.e., no third core) the program code may return to block 102. In block 110, the program code selects the third core and replicates the execution context and associated data from the second core to the third core.

In block 112, the program code configures the node 32 associated with the third core with a monitor 59 to monitor the locked resource. The monitor 59 may be used to assist the third core, or program code, in monitoring the locked resource to determine when it is no longer locked. In particular, the monitor 59 may include a list indicating an order for computing cores 34 waiting to lock the locked resource. In block 112, the program code further configures the third core with a speculative lock on the resource. The speculative lock enables the third core to access the resource and execute the replicated execution context as if it had been granted a lock, but does not provide the third core access to modify the resource. As such, the third core may execute the replicated execution context in parallel to the first core without serializing, stalling, or waiting for access to the locked resource. In one embodiment, where the lock request is for data on a resource, the program code copies data from the resource to the third core in block 112. In block 112, the program code initiates execution of the replicated execution context in the third core.

In block 114, the program code determines whether there has been, or will be, a conflict between the replicated execution context and the locked resource. As one example, a conflict may occur when the first core changes the resource such that data copied from the resource onto the third core and the data in the resource are no longer consistent. As another example, a conflict may occur when the first core and third core attempt to access a resource at the same time. As yet another example, a conflict may occur when the third core attempts to modify the locked resource. When the program code determines that there is a conflict, the program code halts the third core in block 116. In one embodiment, the program code restarts the replicated execution context in the third core to resolve the conflict in block 118. In an alternate embodiment, the program code reverses the stack 58 of the replicated execution context to resolve the conflict in block 118. In block 120, the program code may synchronize the third core with the resource after the resource has been updated, thus maintaining consistency of the resource data and data that may be copied from the resource and used by the third core. In this way, the third core may process the replicated execution context in parallel with the newest data from the resource. The program code then returns to block 112 and executes the replicated execution context in the third core with the speculative lock and monitor 59.

Returning to block 114, when the program code determines that there is not a conflict, the program code determines whether the lock on the resource has been released by the execution context on the first core in block 122. The monitor 59 may assist the program code in determining when the resource is no longer locked. When the program code determines that the resource is still locked, the program code determines if the third core has completed the replicated task in block 124. When the third core has completed the task, the program code instructs the third core to release the speculative lock in block 126 and synchronizes the second core with the third core in block 128. The second core may, in some embodiments, store, transmit, or perform further operations on the data that is a result of the completed replicated execution context. After the execution context and replicated execution context are completely finished, the program code may free the second and third cores to be repurposed by the system 10.

Returning to block 124, when the program code determines that the third core has not completed the replicated execution context, the program code returns to block 114 to determine if a conflict has been detected.

Returning to block 122, when the program code determines that the lock on the resource has been released, the program code determines the next execution context to receive a lock on the resource in block 130. In one embodiment, the program code may determine this information from the monitor 59 configured on the third core. In block 132, the program code determines whether the execution context on the second core was granted the lock on the resource. When that execution context is not granted the lock on the resource, the program code continues back to block 124. When the execution context on the second core is granted the lock on the resource, the program code grants the lock to the second core and synchronizes the second core with the third core in block 134. In block 136, the program code frees the third core, allowing it to be repurposed by the system 10.

When the request to lock a resource is granted in block 104 or the program code has proceeded from block 136, the program code locks the resource for the execution context on the second core in block 138. In block 140, the program code executes and completes the execution context in the second core with the locked resource. The second core, may, in some embodiments, store, transmit, or perform further post-processing routines on the data that is a result of the completed execution context in block 140. In block 142, after the execution context has been completed, the program code releases the lock and frees the second core to be repurposed by the system 10. After the second core is completely finished with the execution context, the program code may free the second core to be repurposed by the system 10.

It will be appreciated by one skilled in the art that methods of determining historical and/or system configuration information are well known in the art. For example, and not intending to be limiting, the system 10 may store historical and/or system configuration information consistent with that disclosed above after each block illustrated in FIG. 5.

Resource Sharing Via Execution Context Shadowing

In one embodiment consistent with aspects of the invention, resource contention issues that arise when multiple execution contexts attempt to lock a resource are addressed by shadowing execution contexts. In particular, in response to receiving an execution context, the execution context may be shadowed as a first execution context configured on a pessimistic core and a second execution context configured on an optimistic core. The first and second execution contexts may be provided with access to the resource such that both may perform work while having access to the resource. In response to a request to lock the resource from the first or second execution context being denied, the first execution context is halted while the second execution context may continue. Thus, although the lock request is denied, the processing of the second execution context continues.

After the lock request is granted, it may be determined whether the resource was modified while the lock request was blocked. The first execution context is synchronized to the second execution context in response to determining that the resource was not modified while the request was blocked. As such, an execution context, which may have been configured as first and second execution contexts, has been operating in parallel while a lock request was blocked. However, the second execution context is synchronized to the first execution context in response to determining that the resource was modified while the request was blocked. As such, an execution context that experiences a conflict is restarted or reversed, while if no conflict occurs, the execution context has been allowed to proceed as if it had been granted the lock in the first place, and thus with little adverse impact on performance. Thus, by shadowing an execution context, more than one computing core is provided consistent access to the resource.

Figure 6:
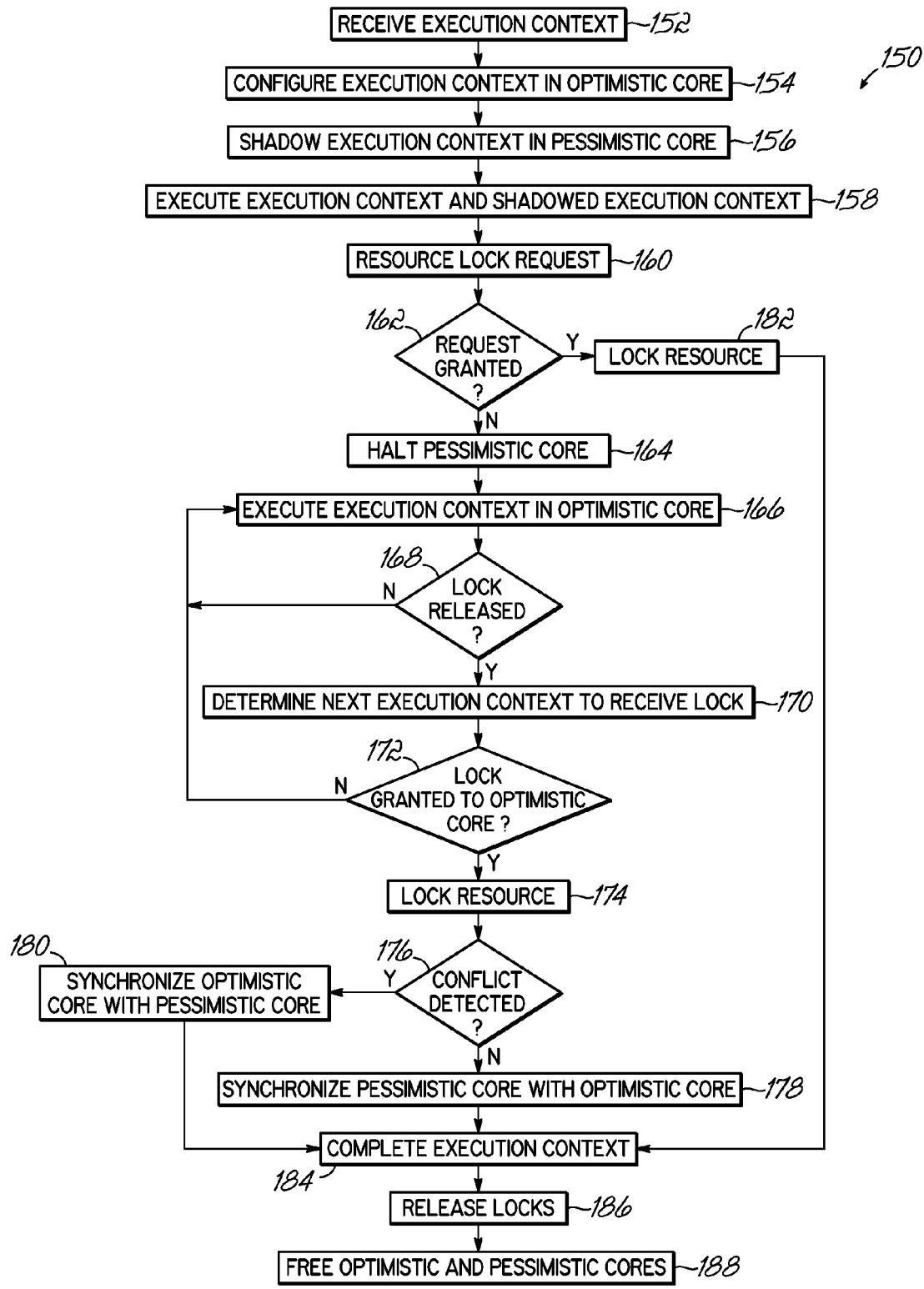
FIG. 6 is a flowchart 150 illustrating blocks of a program code executable by the parallel processing computing system of FIG. 1 and FIG. 2 to address issues that arise when multiple execution contexts attempt to access a resource by shadowing execution contexts.

FIG. 6 is a flowchart 150 illustrating blocks of a program code executable by the system 10 of FIG. 1 and FIG. 2 to address lock contention issues by shadowing execution contexts to separate cores. The flowchart 150 illustrates a process to maintain concurrency in multiple execution contexts, nodes 32, and/or computing cores 34 without serializing, stalling, or waiting for resource access in the event of a blocked lock request. In particular, the process at flowchart 150 illustrates configuring an execution context in two computing cores 34. When a lock request is denied, one execution context continues on an optimistic core while a shadowed execution context waits on a pessimistic core. If a lock request is eventually granted without a detected conflict, the optimistic core is considered consistent with the resource and the pessimistic core is synchronized with the optimistic core. If a conflict is detected, the optimistic core is considered inconsistent with the resource and the optimistic core is synchronized with the pessimistic core.

In block 152, the program code receives a task or execution context. In one embodiment, the execution context may come from a user of the system 10, or the service nodes 20 may notify the program code of an execution context to be configured on a core 34. In block 154, the program code configures the execution context in a computing core 34 (hereinafter, an "optimistic core"), and in block 156 the program code shadows the execution context in another computing core 34 (hereinafter, a "pessimistic core"). Shadowing the execution context replicates the execution context in the pessimistic core, allowing the execution of the execution context and shadowed execution context (i.e., the execution context that is shadowed is the "shadowed execution context") concurrently in block 158. Alternatively, the program code may utilize the pessimistic core as "holding core". In block 160, one or the other of the execution context or the shadowed execution context associated with the optimistic core or pessimistic core, respectively, issues a lock request for a resource.

In block 162, the program code determines whether the lock request has been granted. When the lock request is denied, the program code halts the pessimistic core, grants a speculative lock for the resource to the optimistic core, and configures the node 32 associated with the optimistic core with a monitor 59 to monitor the locked resource in block 164. The speculative lock enables the optimistic core to access the resource and execute the execution context as if the optimistic core had been granted a lock, but does not allow the optimistic core to modify the resource. The monitor 59 configured on the node 32 associated with the optimistic core may be used to assist the optimistic core, or program code, in monitoring the locked resource to determine when it is no longer locked. In particular, the monitor 59 may include a list indicating an order for computing cores 34 waiting to lock the locked resource. As such, the optimistic core may execute the execution context in parallel with the computing core 34 granted the lock on the resource without serializing, stalling, or waiting for access to the locked resource in block 166.

In block 168, the program code determines whether the lock on the resource has been released. When the lock has not been released, the optimistic code continues to execute the execution context in block 166. When the lock has been released, the program code determines the next execution context to receive a lock on the resource in block 170. In one embodiment, the program code may determine this information from the monitor 59 configured on the node 32 associated with the optimistic core. In block 172, the program code determines whether the execution context on the optimistic core was granted the lock on the resource. When the execution context on the optimistic core is not granted the lock on the resource, the program code continues back to block 166. When the execution context on the optimistic core is granted the lock on the resource, the program code grants a lock to the optimistic core for the resource in block 174. In blocks 166 through 172, it will be appreciated that the optimistic core may complete execution of its execution context. In that instance, the optimistic core, which has been granted a speculative lock, will wait to receive a lock to perform post-processing routines, such as updating the resource.

In block 176, the program code determines whether there has been a conflict between the execution context and the locked resource similar to that determination in block 114 of FIG. 5. When the program code determines that there has not been a conflict, the program code synchronizes the pessimistic core with the optimistic core in block 178. When the program code determines that there has been a conflict, the program code halts the optimistic core and synchronizes it with the pessimistic core in block 180. The program code also synchronizes the optimistic core with the resource in block 180. Thus, in block 180, the program code ensures consistency within the resource and prevents any conflicts that may have arisen, as well as ensures that the optimistic core is processing with the updated resource.

Returning to block 162, when the lock request is granted, the optimistic core is granted a lock on the resource. After the synchronization of blocks 178 or 180, or the resource locking of block 182, the optimistic core and pessimistic core may complete execution of the execution context and the shadowed execution context, respectively. The optimistic core, may, in some embodiments, store, transmit, or perform further post-processing routines on the data after completion of the execution context in block 186. The lock by the execution context on the optimistic core is released in block 186. In block 188, the program code releases the optimistic core and the pessimistic core to be re-purposed by the system 10.

While the present invention has been illustrated by a description of the various embodiments and the examples, and while these embodiments have been described in considerable detail, it is not the intention of the applicants to restrict or in any way limit the scope of the appended claims to such detail. Additional advantages and modifications will readily appear to those skilled in the art. Thus, the invention in its broader aspects is therefore not limited to the specific details, representative apparatus and method described.

One having ordinary skill in the art will further appreciate that the disclosure of the present invention is suitable to implement replicating and shadowing tasks in nodes 32, as well as in the computing cores 34 of nodes 32. Additionally, instead of execution contexts being replicated in separate computing cores 34, the execution contexts may be replicated in separate nodes 32 without departing from the scope of the invention. Similarly, instead of execution contexts being shadowed in separate computing cores 34, the execution contexts may be shadowed in separate nodes 32 without departing from the scope of the invention. Additionally, one having ordinary skill in the art will appreciate that the disclosure of the present invention is suitable to implement replicating and shadowing execution contexts in compute nodes 12, I/O nodes 14, front end nodes 16, and service nodes 20, as well as computing systems configured as nodes 32 of the parallel processing computing system 10.

Nor is the invention in its broader aspects limited to the specific process of the flowcharts illustrated in FIG. 5 and FIG. 6. As such, the blocks of FIG. 5 and FIG. 6 may be re-ordered without departing from the scope of the invention. With reference to FIG. 5 and FIG. 6, one having ordinary skill in the art will appreciate that the monitor 59 may be configured on various cores 34 or nodes 32 other than those disclosed. For example, the monitor 59 may be configured on a core 34 with an execution context that is denied a lock on a resource and monitored by the program code to determine which computing core 34 is next to receive a lock. Alternately, the monitor 59 may be configured on a separate node 32 and/or separate core 34 dedicated only to determine the computing cores 34 next to receive locks on the resource.

Furthermore, one having ordinary skill in the art will appreciate that the disclosure of the present invention is suitable to implement across a multi-computing core system. As such, it will be appreciated that the program code consistent with the present invention is configured to perform a process consistent with the invention across a plurality of computing cores, and not just the first, second, third, optimistic, and pessimistic cores that have been described. Additionally, one having ordinary skill in the art will appreciate that the first, second, third, optimistic, and pessimistic cores may be configured on the same node 32, or same core 34, or different nodes 32 or different cores 34. Accordingly, departures may be made from such details without departing from the scope of applicants' general inventive concept.

What is claimed is:

1. A method of sharing a resource in a computing system of the type that includes a plurality of computing cores, the method comprising:
   in response to receiving a request by a second execution context to obtain a lock on the resource, determining whether a lock is held by a first execution context executing on a first computing core;
   in response to determining that the lock is held by the first execution context, determining whether to replicate the second execution context based at least in part on historical information associated with the lock;
   in response to a positive determination to replicate the second execution context, replicating the second execution context as a third execution context on a second computing core from among the plurality of computing cores;
   executing the first and third execution contexts substantially in parallel; and
   in response to the first execution context modifying the resource, reversing the third execution context after the resource has been modified.

2. The method of claim 1, further comprising:
   in response to neither the first nor third execution context modifying the resource, synchronizing the second execution context with the third execution context after the lock is released.

3. The method of claim 1, further comprising:
   in response to the first execution context modifying the resource, determining whether the modification creates a conflict between the resource and the third execution context.

4. The method of claim 3, wherein the conflict is created when the first execution context modifies at least a portion of the resource that is being accessed by the third execution context.

5. The method of claim 3, further comprising:
   in response to determining that modification does not create a conflict between the resource and the third execution context, synchronizing the second execution context with the third execution context after the lock is released.

6. The method of claim 1, further comprising:
   determining historical information that includes information about a length of time the lock has previously been held,
   wherein the determination to replicate the second execution context is made by analyzing the historical information.

7. The method of claim 1, further comprising:
in response to the third execution context attempting to modify the resource while the lock is held by the first execution context, restarting the third execution context.

8. The method of claim 1, wherein the computing system is a massively parallel computer system of the type that includes a plurality of computing nodes, wherein each computing node includes at least one computing core.

9. The method of claim 8, wherein the third execution context executing on the second computing core and the second execution context are configured on the same computing node.

10. The method of claim 8, wherein the third execution context executing on the second computing core is configured on a first computing node and the second execution context is configured on a second computing node.

11. The method of claim 1, further comprising:
in response to determining that the third execution context attempts to modify the resource, determining whether the modification creates a conflict between the resource and the first execution context.

12. The method of claim 11, wherein the conflict is created when the third execution context attempts to modify at least a portion of the resource being accessed by the first execution context.

13. The method of claim 1, wherein reversing the third execution context further comprises:
restarting the third execution context.

14. The method of claim 1, wherein reversing the third execution context further comprises:
reversing the operations of an application stack of the third execution context to a point before the modification of the resource;
synchronizing the third execution context with the updated resource; and
executing the first and third execution contexts substantially in parallel.

15. A method of sharing a resource in a computing system of the type that includes a plurality of computing cores, the method comprising:
configuring a first execution context on a first computing core and configuring a copy of the first execution context as a second execution context on a second computing core;
shadowing the first execution context with the second execution context by concurrently executing the first execution context on the first computing core and the second execution context on the second computing core;
in response to a request to lock the resource from one of the first and second execution contexts being blocked, halting the first execution context while continuing to execute the second execution context;
after the request to lock the resource is granted, determining whether the resource was modified while the request was blocked;
synchronizing the first execution context to the second execution context in response to determining that the resource was not modified while the request was blocked; and
synchronizing the second execution context to the first execution context in response to determining that the resource was modified while the request was blocked.

16. A computing system, comprising:
a plurality of computing cores, each computing core including a processing unit; and
program code configured to be executed by a first processing unit among the respective processing units of the plurality of computing cores to share a resource of the computing system, the program code further configured to, in response to receiving a request by a second execution context to obtain a lock on the resource, determine whether a lock is held by a first execution context executing on a first computing core, in response to determining that the lock is held by the first execution context, determine whether to replicate the second execution context based at least in part on historical information associated with the lock, in response to a positive determination to replicate the second execution context, replicate the second execution context as a third execution context on a second computing core from among the plurality of computing cores, execute the first and third execution contexts substantially in parallel, and reverse the third execution context after the resource has been modified and in response to the first execution context modifying the resource.

17. The system of claim 16, wherein the program code is further configured to, in response to neither the first nor third execution context modifying the resource, synchronize the second execution context with the third execution context after the lock is released.

18. The system of claim 16, wherein the program code is further configured to, in response to determining that the first execution context modifies the resource, determine whether the modification creates a conflict between the resource and the third execution context.

19. The system of claim 18, wherein the conflict is created when the first execution context modifies at least a portion of the resource that is being accessed by the third execution context.

20. The system of claim 18, wherein the program code is further configured to, in response to determining that modification does not create a conflict between the resource and the third execution context, synchronize the second execution context with the third execution context after the lock is released.

21. The system of claim 16, wherein the program code is further configured to determine historical information that includes information about a length of time the lock has previously been held, wherein the determination to replicate the second execution context is made by analyzing the historical information.

22. The system of claim 16, wherein the program code is further configured to restart the third execution context in response to the third execution context attempting to modify the resource while the lock is held by the first execution context.

23. The system of claim 16, wherein the computing system is a massively parallel computing system of the type that includes a plurality of computing nodes, wherein each computing node includes at least one computing core.

24. The system of claim 16, the program code is further configured to reverse an application stack of the third execution context to a point before the modification of the resource, synchronize the third execution context with the updated resource, and execute the first and third execution context substantially in parallel.

25. A program product, comprising:
program code configured to be executed by at least one processor of at least one computing core from among a plurality of computing cores configured in a computing system, the program code further configured to share a resource of the computing system by, in response to receiving a request by a second execution context to obtain a lock on the resource, determining whether a lock is held by a first execution context executing on a first computing core, in response to determining that the lock is held by the first execution context, determining whether to replicate the second execution context based at least in part on historical information associated with the lock, in response to a positive determination to replicate the second execution context, replicating the second execution context as a third execution context on a second computing core from among the plurality of computing cores, executing the first and third execution contexts substantially in parallel, and restarting the third execution context after the resource has been modified in response to the first execution context modifying the resource; and a non-transitory computer recordable medium bearing the program code.

* * * * *